July 18, 1961     R. BLOOM, JR., ET AL     2,992,638
INTERNAL COMBUSTION ENGINE AND METHOD OF OPERATING SAME
Filed April 1, 1953
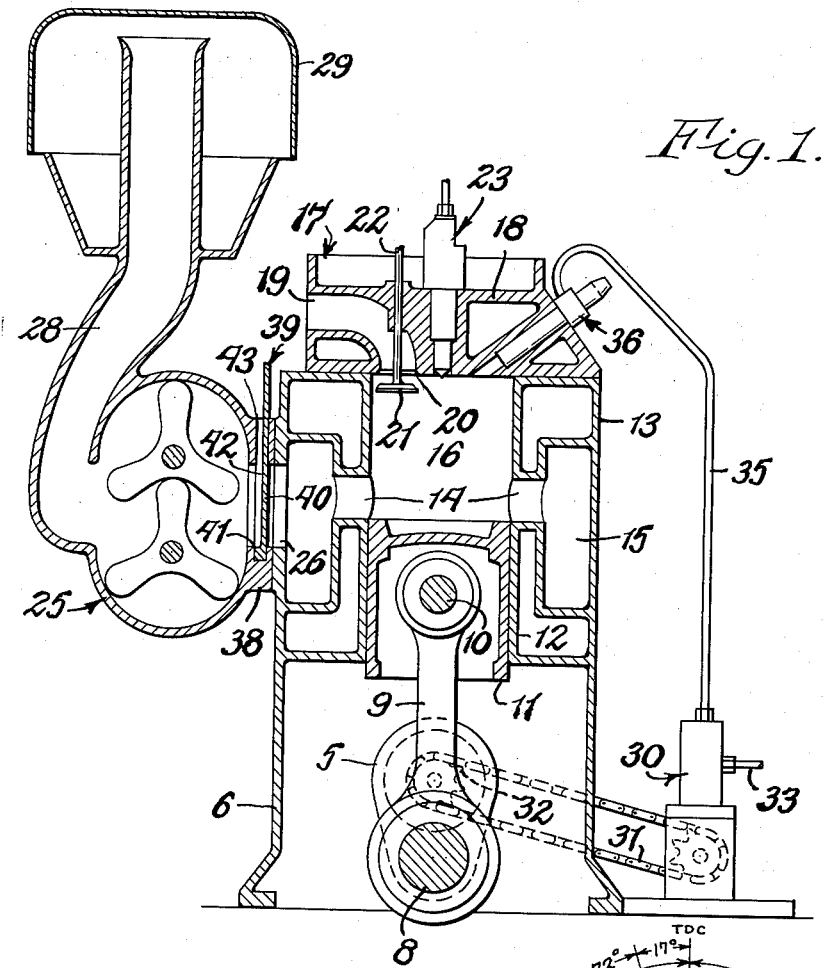
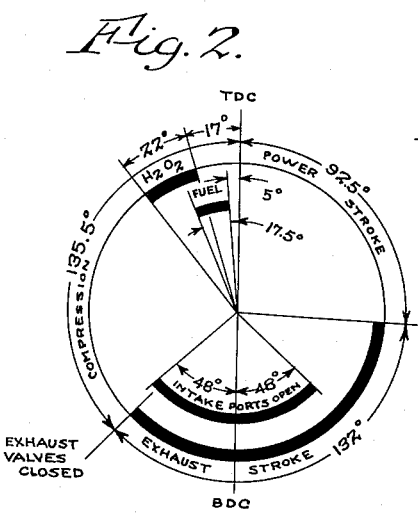
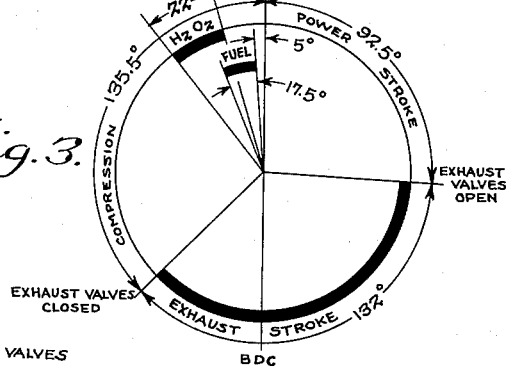
INVENTORS
Ralph Bloom, Jr.
James C. McCormick
by Popp and Sommer
Attorneys.

United States Patent Office 2,992,638
Patented July 18, 1961

2,992,638
INTERNAL COMBUSTION ENGINE AND METHOD OF OPERATING SAME
Ralph Bloom, Jr., Kenmore, and James C. McCormick, Buffalo, N.Y., assignors, by mesne assignments, to Food Machinery and Chemical Corporation, San Jose, Calif., a corporation of Delaware
Filed Apr. 1, 1953, Ser. No. 346,114
1 Claim. (Cl. 123—1)

This invention relates to an internal combustion engine and method of operating the same and more particularly to such an internal combustion engine and method in which concentrated hydrogen peroxide is used, in whole or part, as the oxidant. By concentrated hydrogen peroxide is meant aqueous solutions having a 50% or higher concentration by weight of hydrogen peroxide, it being advantageous to use higher concentrations in this range because of the higher oxygen content and hence reduced quantity required and also because of the proportionately greater increase in release of energy through decomposition of the hydrogen peroxide.

One of the principal objects of the invention is to provide a practicable internal combustion engine and method of operating the same which will operate without access to atmospheric air for propulsion of vehicles below the surface of water or at altitudes where the air density is insufficient for efficient internal combustion engine operation.

Another object is to provide such an internal combustion engine and method of operating the same which can be provided, in its normal operation, with a rapid and large increase in power when a burst of power is required to provide an increase in vehicle or aircraft speed or to overcome an obstacle or to accomplish an emergency maneuver for tactical reasons.

Another object is to provide an internal combustion engine and method of operating the same in which such power burst can be sustained for any desired length of time.

Another purpose is to provide such an internal combustion engine and method of operating the same in which the energy released by the decomposition of the concentrated hydrogen peroxide employed in whole or part as the oxidant is usefully employed in the development of engine power.

Another aim is to provide such an internal combustion engine which can be of standard construction and need only be modified by the addition of a mechanism for injecting concentrated hydrogen peroxide in liquid form into the cylinders or combustion chambers, and in which such addition can be readily effected without substantial modification of the standard internal combustion engine.

Another object is to provide such an injector mechanism for the concentrated hydrogen peroxide in which the injector can be of conventional form of liquid injectors, except for the metals employed, such as a conventional fuel injector for diesel engines.

Another object is to provide such an internal combustion engine and method of operating the same which involves the direct injection of the liquid concentrated hydrogen peroxide into the combustion zone instead of using gaseous products such as oxygen or the gaseous decomposition products of the hydrogen peroxide.

Another object is to provide such an internal combustion engine and method of operating the same in which the requirements for any desired set of conditions can readily be obtained by calculation.

Another object is to provide such an internal combustion engine in which there is no need for special metals in the cylinder and piston walls because of the use of concentrated hydrogen peroxide.

Other objects and advantages of the invention will be apparent from the following description and drawings in which:

FIG. 1 is a diagrammatic sectional representation of a standard 2-cycle diesel engine modified for operation in accordance with the present invention.

FIG. 2 is a cycle timing diagram related to the diesel engine shown in FIG. 1 and to its operation in obtaining optimum increase in power by the injection of highly concentrated hydrogen peroxide directly into the cylinder thereof, atmospheric air also having been introduced by a scavenging blower.

FIG. 3 is a timing diagram related to the diesel engine shown in FIG. 1 and to its optimum operation with concentrated hydrogen peroxide used as the sole oxidant, such concentrated hydrogen peroxide being injected directly into the cylinder in place of the atmospheric air normally used.

In FIG. 1 is illustrated diagrammatically a conventional single cylinder two cycle marine type of blower scavenged diesel engine modified in accordance with the present invention. The engine is shown as having a crank shaft 5 journalled in its base 6 and as having its crank 8 connected by a connecting rod 9 to a wrist pin 10 within a piston 11. This piston works in a cylinder 12 which can be water jacketed as at 13 and is provided with scavenging air inlets 14 providing communication between the bottom of the cylinder 12 and a manifold or scavenging box 15. These inlets 14 are fully exposed when the piston 11 is at the bottom of dead center and are closed by the piston as it passes beyond the bottom of dead center. The piston 11 and cylinder 12 jointly provide a combustion chamber 16 into which the concentrated hydrogen peroxide is directly injected as hereinafter described.

The cylinder head 17 can also be water jacketed, as indicated at 18 and is provided with an exhaust passage 19 leading from an exhaust port 20. This port is opened and closed by an exhaust valve 21 actuated by its stem 22. Diesel fuel is injected into the cylinder 12 by a conventional fuel injector 23.

A scavenging blower 25 is arranged to blow air through a port 26 into the manifold or scavenging box 15. The blower 25 has an air inlet 28 the upper inlet end of which is shown as being hooded, as indicated at 29.

To the above conventional type of marine diesel engine, for the practice of the present invention, is added a plunger pump 30 for injecting the hydrogen peroxide. This pump can be driven by a chain 31 from a sprocket 32 on the crank shaft 5 of the engine. Concentrated hydrogen peroxide is supplied to an inlet 33 of the plunger pump and the concentrated hydrogen peroxide is pumped through an outlet line 35 to an injector 36 which injects the hydrogen peroxide as a spray directly into the combustion chamber 16. This injector 36 can be of the same construction as a standard fuel injector 23 except that it is preferably made of stainless steel or some other material which is compatible with concentrated hydrogen peroxide.

In addition, where the internal combustion engine is to be used without air, the outlet neck 38 of the blower is provided with a spill valve indicated generally at 39, and arranged to close the port 26. This spill valve 39 is shown as being in the form of a slide or gate 40 working in a slideway 41 crossing the opening through the outlet neck 38 of the blower and extending exteriorly of the neck. The side of this slide or gate 40 facing the operating parts of the blower is shown as being relieved, as indicated at 42, so that when the slide or gate 40 is closed, as shown in FIG. 1, the blower can discharge through 43 to the atmosphere.

Operation

The diesel engine used, before the addition of the hydrogen peroxide injector 36, plunger pump 30 and the spill valve 39, was a single cylinder blower scavenged marine type two cycle diesel engine having a displacement of 71 cubic inches, and rated 15 brake horsepower (hereinafter designated B.H.P.) at 1200 r.p.m.

In all cases the diesel engine was started and warmed up on atmospheric air, following which liquid hydrogen peroxide at a concentration of 90% by weight was injected by the injector 36 as a spray into the combustion chamber 16 while air was still supplied by the scavenging blower 25. The invention however, of course, comprehends starting the internal combustion engine by other methods. For tests on operation without atmospheric air, the air intake was shut off by closing the spill valve 39 and the engine continued constant speed operation with hydrogen peroxide as the only oxidant. Such conversion to operation on hydrogen peroxide to the exclusion of air could be accomplished one minute after the engine was warmed up at half load or greater. Such conversion at full power was uneventful.

It was found essential that the temperature within the combustion chamber be at least about 250° F. in order to effect the necessary substantially instantaneous decomposition of the injected hydrogen peroxide either to boost the power of the engine while operating with atmospheric air or to operate the engine without atmospheric air.

With the above diesel engine rated at 15 B.H.P. at 1200 r.p.m., by the addition of 90% by weight hydrogen peroxide, the B.H.P. was increased to 31.7 to provide the desired power boost required for increased vehicle speed, to overcome obstacles or to accomplish an emergency maneuver for tactical reasons. With the above diesel engine running with concentrated hydrogen peroxide as the sole oxidant, a B.H.P. of 21.5 was measured.

Power boost operation

Referring to the cycle timing diagram, FIG. 2, for optimum power boost in the practice of the present invention, compression of the air starts at 135.5° BTDC (before top dead center) with the closing of the exhaust valve 21; a hydrogen peroxide injection from the injector 36 and induced by a stroke of the plunger pump 30 starts at 39° BTDC and continues for 22° duration; diesel fuel injection from the fuel injector 23 starts at 22.5° BTDC and continues for 17.5° duration; the power stroke continues until the exhaust valve 21 opens at 92.5° ATDC (after top dead center) and remains open for 132° duration; and air scavenging and intake starts when the piston 11 uncovers the ports 14 at 132° ATDC and continues for 96° to 132° BTDC.

In operation, the engine was started and warmed up on air before hydrogen peroxide injection was started. Following this warming up a constant quantity of 1.5 pounds per minute of 90% concentration by weight of hydrogen peroxide was injected by the injector 36 into the combustion chamber 16 and the engine was loaded to a maximum of 31.7 B.H.P. or 211.4% of the normal output at 1200 r.p.m. Diesel fuel consumption at this output was .347 pound per B.H.P.-hour, exhaust temperature was 910° F. and peak cylinder pressure was 1100 p.s.i.g. (pounds per square inch-gage). This output was limited by the capacity of the load system.

Direct injection of concentrated hydrogen peroxide into the combustion chamber 16 while the diesel engine was operating on air proved that decomposition of the concentrated hydrogen peroxide took place with sufficient rapidity when the liquid hydrogen peroxide was injected into the flame resulting from ignition of the charge within the combustion chamber. Advancing the point of hydrogen peroxide injection continued to result in sufficiently rapid decomposition of the hydrogen peroxide. Boost power was attained when injection occurred at approximately 8° BTDC. Maximum boost power was attained with injection at approximately 39° BTDC (FIG. 2). Continuing to advance the point of hydrogen peroxide injection beyond approximately 39° BTDC reduced total power output and at approximately 43° BTDC fuel ignition delay approached the maximum allowable and the rate of decomposition of the hydrogen peroxide was too slow at light load. Accordingly it was found that the hydrogen peroxide could be advantageously injected into the combustion chamber from approximately 8° to approximately 43° BTDC and that maximum power boost was obtained at approximately 39° BTDC.

The duration of introduction of hydrogen peroxide can continue beyond top dead center and can be effectively continued up to about 45° ATDC. The longer the duration of fuel and hydrogen peroxide introduction, the greater the amount of fuel and hydrogen peroxide introduction, and hence the greater the power output of the engine.

Boost power attained was in excess of that calculated theoretically because it was possible to increase the quantity of fuel injected without exceeding a 1200 p.s.i.g. peak pressure in the combustion chamber.

Operation without air

Referring to the cycle timing diagram, FIG. 3, for optimum operation with concentrated hydrogen peroxide as the sole oxidant, compression of the residual gases in the combustion chamber 16 starts at 135.5° BTDC with the closing of the exhaust valve 21; a hydrogen peroxide injection from the injector 36 and induced by a stroke of the plunger pump 30 starts at 39° BTDC and continues for 22° duration; diesel fuel injection from the fuel injector 23 starts at 22.5° BTDC and continues for 17.5° duration; the power stroke continues until the exhaust valve 21 opens at 92.5° ATDC and remains open for 132° duration. In operation with hydrogen peroxide as the sole oxidant, the spill valve 39 was closed and the output of the scavenging blower by-passed through the outlet 43.

Operation without air and by the direct injection of hydrogen peroxide was accomplished by closing the spill valve 39 following boost power operation as above described. Operation without air was smooth and fuel ignition delay was zero; peak cylinder pressure was lower than for corresponding power output with air as the oxidant; and exhaust temperature was high, being about 1500° F.

Operation with the hydrogen peroxide as the oxidant to the exclusion of air was found to be possible when the hydrogen peroxide was injected at approximately 8° BTDC (FIG. 3). Advancing the point of injection improved the operation and power output. With injection at approximately 39° BTDC excellent hydrogen peroxide economy was attained. Specific consumption of hydrogen peroxide was 3.44 pounds per B.H.P.-hour with 1175° F. exhaust at 16.2 B.H.P. and 3.66 pounds per B.H.P.-hour with 1440° F. exhaust at 21.6 B.H.P., the latter being the maximum power output obtained. At this maximum power output, the fuel consumption was .5 pound per B.H.P.-hour. The firing pressure was 840 p.s.i.g. The injection pressure for the hydrogen peroxide was 1050 p.s.i.g. Power developed on direct injection of hydrogen peroxide in lieu of air was 144% of the normal output on air at 1200 r.p.m. Also operation was 10% fuel rich and combustion was 95% complete at this maximum power output, the engine operation thereby approaching the maximum obtainable. Increase of fuel and hydrogen peroxide to develop a peak pressure of 1000 p.s.i.a. (pounds per square inch absolute) would increase power output and might reduce specific consumption rates somewhat. However, the resulting increase in exhaust temperature would probably burn the exhaust valves very rapidly. The above operation of the engine caused no abnormal distress of any of the engine parts.

As with operation on power boost, continuing to advance the point of injection of hydrogen peroxide beyond approximately 39° BTDC reduced total power output and at about approximately 43° BTDC the rate of hydrogen peroxide decomposition was too slow at light load. Accordingly, with operation using hydrogen peroxide to the exclusion of air, the hydrogen peroxide can be advantageously injected into the combustion chamber from approximately 8° BTDC to approximately 43° BTDC with optimum injection at approximately 39° BTDC. Also as with operation on power boost, the duration of introduction of hydrogen peroxide can continue beyond top dead center and can be effectively continued up to about 45° ATDC. The longer the duration of fuel and hydrogen peroxide admission, the greater the amount of fuel and hydrogen peroxide introduction, and hence the greater the power output of the engine.

While the invention has been particularly described in connection with a diesel engine of a particular type, it will be understood that the invention is essentially directed to the injection of liquid high concentration hydrogen peroxide directly into the combustion chamber during the compression stroke and is applicable to other types of internal combustion engines, such as spark ignited reciprocating piston engines as well as in engines where the compression and expansion processes are carried out as a pulsating wave phenomena so as to eliminate the need for the usual reciprocating mechanical piston.

We claim:

An internal combustion engine, comprising a cylinder, a piston in said cylinder and forming with said cylinder a combustion chamber, means for introducing fuel into said combustion chamber, an injector discharging directly into said combustion chamber, means arranged to discharge a charge of liquid hydrogen peroxide having a concentration of at least 50% by weight from said injector in timed relation to the movement of said piston, a scavenging blower arranged to scavenge said combustion chamber with atmospheric air and a spill valve interposed between said scavenging blower and said combustion chamber to cut said combustion chamber off from access to atmospheric air.

References Cited in the file of this patent

UNITED STATES PATENTS

| | | |
|---|---|---|
| 1,154,609 | Bruniquel | Sept. 28, 1915 |
| 2,478,682 | Blackwood | Aug. 9, 1949 |
| 2,555,029 | Fehling et al. | May 29, 1951 |
| 2,631,426 | Jewett | Mar. 17, 1953 |
| 2,673,069 | Carpenter | Mar. 23, 1954 |

OTHER REFERENCES

"Industrial Bulletin" of Arthur D. Little Inc., Cambridge, Mass., No. 220, April 1946, pp. 2 and 3.